United States Patent
Jun et al.

(10) Patent No.: US 12,332,164 B2
(45) Date of Patent: Jun. 17, 2025

(54) DUAL RESOLUTION SPECTROMETER, AND SPECTROMETRIC MEASUREMENT APPARATUS AND METHOD USING THE SPECTROMETER

(71) Applicant: SAMSUNG ELECTRONICS CO., LTD., Suwon-si (KR)

(72) Inventors: Sunhong Jun, Suwon-sl (KR); Jaeho Kim, Suwon-si (KR); Younghoon Sohn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 205 days.

(21) Appl. No.: 18/118,816

(22) Filed: Mar. 8, 2023

(65) Prior Publication Data

US 2024/0035957 A1  Feb. 1, 2024

(30) Foreign Application Priority Data

Aug. 1, 2022  (KR) ........................ 10-2022-0095690

(51) Int. Cl.
| | |
|---|---|
| *G01N 21/25* | (2006.01) |
| *G01N 21/27* | (2006.01) |
| *G01N 21/95* | (2006.01) |

(52) U.S. Cl.
CPC ........... *G01N 21/255* (2013.01); *G01N 21/27* (2013.01); *G01N 21/9501* (2013.01)

(58) Field of Classification Search
CPC .. G01N 21/255; G01N 21/27; G01N 21/9501; G01N 21/211; G01N 2021/213;
(Continued)

(56) References Cited

U.S. PATENT DOCUMENTS

| | | |
|---|---|---|
| 9,921,104 B2 | 3/2018 | Krishnan et al. |
| 10,386,233 B2 | 8/2019 | Neil |

(Continued)

FOREIGN PATENT DOCUMENTS

| | | | | |
|---|---|---|---|---|
| DE | 102008054733 B4 | * | 2/2021 | ............... G01J 3/02 |
| JP | H09-145477 | | 6/1997 | |

(Continued)

OTHER PUBLICATIONS

DE102008054733_B4-translation (Year: 2021).*
Hamamatsu Learning Center: Quantum Efficiency (Year: 2015).*

*Primary Examiner* — Tarifur R Chowdhury
*Assistant Examiner* — Carlos Perez-Guzman
(74) *Attorney, Agent, or Firm* — Morgan, Lewis & Bockius LLP

(57) ABSTRACT

A dual resolution spectrometer includes a slit plate comprising a slit receiving light reflected from a measurement target. The slit plate directs the light reflected from the measurement target to a first mirror. The first mirror reflects light from the slit to a diffraction grating. The diffraction grating disperses light from the first mirror according to a wavelength of the light. The diffraction grating directs light in a first wavelength region to a second mirror and directs light in a second wavelength region to a third mirror. The second mirror reflects the light in the first wavelength region to a detector. The third mirror reflects the light in the second wavelength region to the detector. The detector detects the light in the first wavelength region and the light in the second wavelength region with different resolutions from each other.

19 Claims, 12 Drawing Sheets

(58) Field of Classification Search
CPC ... G01B 11/0625; G01J 3/0294; G01J 3/2803; G01J 3/22; G01J 3/1804; G01J 3/0208; G01J 3/0205; G01J 3/04; G01J 3/2823; G01J 3/2846

See application file for complete search history.

(56) References Cited

U.S. PATENT DOCUMENTS

| | | | |
|---|---|---|---|
| 10,823,934 B2 | 11/2020 | Marple et al. | |
| 2006/0114458 A1* | 6/2006 | Osawa | G01J 3/0235 356/328 |
| 2010/0048526 A1* | 2/2010 | Taravella | A61P 5/30 514/182 |
| 2020/0149961 A1* | 5/2020 | Hidaka | G01J 3/2823 |

FOREIGN PATENT DOCUMENTS

| | | |
|---|---|---|
| JP | H11-142240 | 5/1999 |
| JP | 4622467 | 2/2011 |
| JP | 4642621 | 3/2011 |
| JP | 7033968 | 3/2022 |

\* cited by examiner

DUAL RESOLUTION SPECTROMETER, AND SPECTROMETRIC MEASUREMENT APPARATUS AND METHOD USING THE SPECTROMETER

CROSS-REFERENCE TO RELATED APPLICATION

This application claims priority under 35 U.S.C. § 119 to Korean Patent Application No. 10-2022-0095690, filed on Aug. 1, 2022 in the Korean intellectual Property Office, the disclosure of which is incorporated by reference in its entirety herein.

1. Technical Field

The present inventive concept relates to a measurement apparatus and method, and more particularly, to a spectrometer, a spectrometric measurement apparatus including the same, and a spectrometric measurement method.

2. Discussion of Related Art

During the manufacture of semiconductor devices, the semiconductor devices may be measured by using a spectrometric measurement method. For example, a semiconductor device may be measured by irradiating light onto a surface of the semiconductor device by using a spectrometric measurement device and receiving and analyzing light reflected from the surface of the semiconductor device. Examples of the spectrometric measurement apparatus utilized in the spectrometric measurement method include a Spectroscopic Ellipsometer (SE) and a Spectroscopic Reflectometer (SR). The SE is a device that analyzes a polarization change of light reflected from a specimen (e.g., a wafer surface) and produces information, such as information about the specimen, types of materials, crystalline states, chemical structures, electric conductivity, etc. The SR is a device that measures a thickness and/or a Critical Dimension (CD) of a thin film by using a phenomenon that wavelength characteristics of light reflected from the thin film change. The SE and the SR generally use broadband light.

SUMMARY

Embodiments of the present inventive concept provide a dual resolution spectrometer that performs precise measurement with increased resolution and a spectrometric measurement apparatus and method using the dual resolution spectrometer.

Technical problems to be solved by embodiments of the present inventive concept are not limited to the above description, and other technical problems may be clearly understood by one of ordinary skill in the art from the descriptions provided hereinafter.

According to an embodiment of the present inventive concept, a dual resolution spectrometer includes a slit plate comprising a slit receiving light reflected from a measurement target. The slit plate directs the light reflected from the measurement target to a first mirror. The first mirror reflects light from the slit to a diffraction grating. The diffraction grating disperses light from the first mirror according to a wavelength of the light from the first mirror. The diffraction grating directs light in a first wavelength region among the light dispersed by the diffraction grating to a second mirror and directs light in a second wavelength region among the light dispersed by the diffraction grating to a third mirror. The second mirror reflects the light in the first wavelength region among the light dispersed by the diffraction grating to a detector. A third mirror reflects the light in the second wavelength region among the light dispersed by the diffraction grating to the detector. The detector detects the light in the first wavelength region and the light in the second wavelength region with different resolutions from each other.

According to an embodiment of the present inventive concept, a spectrometric measurement apparatus includes a light source emitting broadband light. An illumination optical system directs the broadband light from the light source to be incident on a measurement target. An imaging optical system emits light reflected from the measurement target to a dual resolution spectrometer. The dual resolution spectrometer disperses light from the imaging optical system according to a wavelength of the light from the imaging optical system and directs the dispersed light into two wavelength regions to detect the dispersed light in the two wavelength regions with different resolutions from each other.

According to an embodiment of the present inventive concept, a spectrometric measurement method includes emitting broadband light from a light source. The broadband light is directed to be incident on a measurement target by using an illumination optical system. Light reflected from the measurement target is emitted through an imaging optical system. Light from the imaging optical system is dispersed according to wavelength of the light from the imaging optical system by using a dual resolution spectrometer and directing the dispersed light into two wavelength regions to detect the dispersed light in the two wavelength regions with different resolutions from each other.

BRIEF DESCRIPTION OF THE DRAWINGS

Embodiments of the present inventive concept will be more clearly understood from the following detailed description taken in conjunction with the accompanying drawings in which:

FIGS. 213 to 2D are spectrum graphs showing results of measuring a semiconductor device by using the spectrometer of FIG. 2A according to embodiments of the present inventive concept;

DETAILED DESCRIPTION OF EMBODIMENTS

Figure 1:
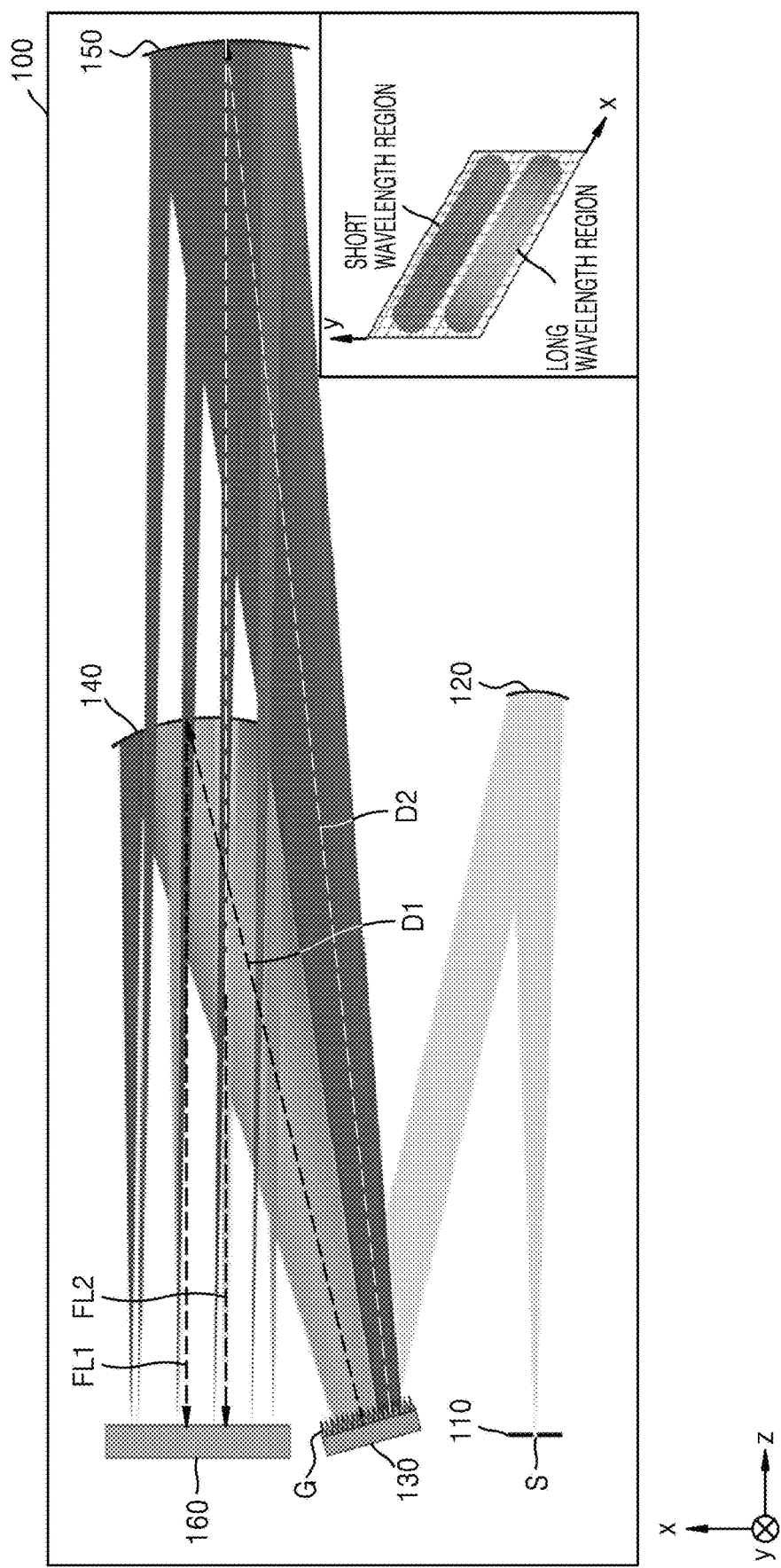
FIG. 1 is a conceptual view of a dual resolution spectrometer according to an embodiment of the present inventive concept.

Hereinafter, one or more embodiments are described in detail with reference to the attached drawings. Like reference numerals in the drawings denote like elements, and repeated descriptions thereof may be omitted for economy of description, FIG. 1 is a conceptual view of a dual resolution spectrometer according to an embodiment. A graph regarding an image detection surface of a detector is shown on the lower right side of FIG. 1. In the graph, the X axis indicates a wavelength, and the Y axis indicates the classification of regions.

Referring to FIG. 1, a dual resolution spectrometer 100 may include a slit plate 110, a first mirror 120, a diffraction grating 130, a second mirror 140, a third mirror 150, and a detector 160.

The slit plate 110 may have a slit S having a certain shape. For example, in an embodiment the slit S in the slit plate 110 may be a linear through hole that extends in a direction on a plane perpendicular to a direction in which light propagates. For example, a widthwise direction of the slit S in the slit plate 110 may be a direction in which light is dispersed by the diffraction grating 130. However, embodiments of the present inventive concept are not necessarily limited thereto. For example, in some embodiments, a plurality of linear slits S may be arranged in the slit plate 110. The slit S in the slit plate 110 may be positioned at a focal position (e.g., a position of an imaging surface) of light focused by an imaging lens 430 (see FIG. 5) of an imaging optical system 400a (see FIG. 5). In an embodiment, light passing through the slit S may be incident on the first mirror 120.

The first mirror 120 may reflect light from the slit S so that the light may be directed towards the diffraction grating 130. In an embodiment, the first mirror 120 may be a collimation mirror. Thus, the first mirror 120 may change the light from the slit S into collimated light and make direct the collimated light to be incident on the diffraction grating 130. In an embodiment, a spherical mirror, such as, a concave spherical mirror, may be used as the first mirror 120. In some embodiments, the first mirror 120 that is a collimation mirror may be comprised of two spherical mirrors, such as a concave spherical mirror and a convex spherical mirror.

The diffraction grating 130 may disperse light that is reflected from the first mirror 120 according to a wavelength of the light due to diffraction. The diffraction grating 130 may direct the dispersed light to be incident on the second mirror 140 and the third mirror 150. Light reflected from the same point on a measurement target 2000 (see FIG. 5) may be incident on the diffraction grating 130 as collimated light through the first mirror 120.

Figure 2A:
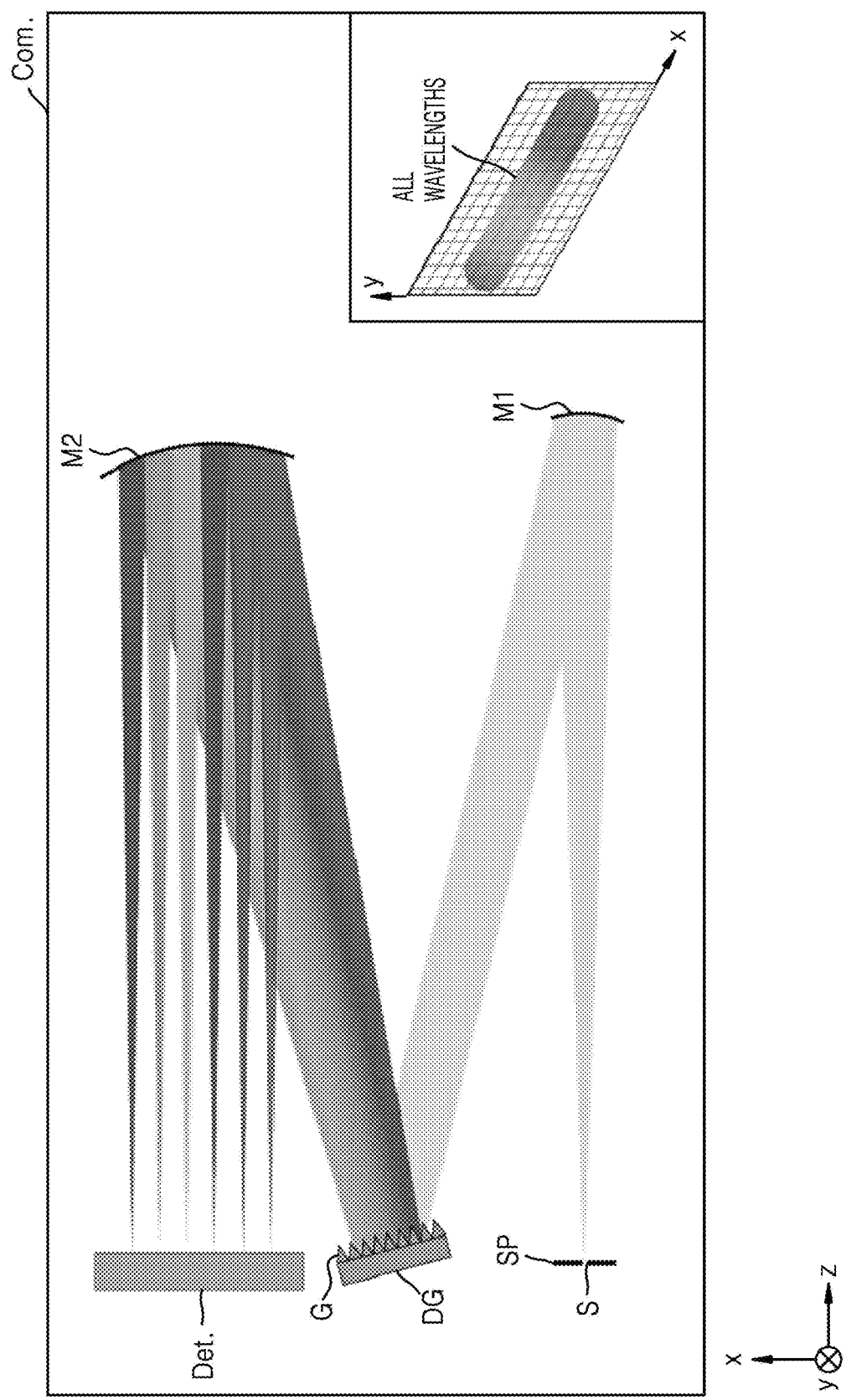
FIG. 2A is a conceptual view of a spectrometer according to a comparative example.

In an embodiment, in the dual resolution spectrometer 100, a grating density or a groove density of the diffraction grating 130 may be in a range of about 30% to about 50% greater than a grating density of a diffraction grating DG of a spectrometer Com. of the Comparative Example shown in FIG. 2A. The diffraction grating may be defined by the number of gratings per unit length in a direction perpendicular to a direction in which the gratings extend. For example, in an embodiment in which a density of the diffraction grating DG of the spectrometer Com, of the Comparative Example is 1000/mm, the grating density of the diffraction grating 130 of the dual resolution spectrometer 100 may be in a range of about 1300/mm to about 1500/ruin. However, embodiments of the present inventive concept are not necessarily limited thereto and the grating density of the diffraction grating 130 may vary from above numerical range.

In general, as the density of the diffraction grating 130 increases, an angle at which light is diffracted by the diffraction grating 130, such as an angle of diffraction of light, may increase. Also, the angle of diffraction may differ according to wavelengths of the incident light. Therefore, when light in broadband (e.g., light covering a large range of wavelengths) is incident on the diffraction grating 130, the light may be dispersed according to wavelengths of the light. Also, the angle of diffraction may be greater in a relatively long wavelength than in a relatively short wavelength. For example, when the incident light in broadband is incident on the diffraction grating 130, light in a relatively short wavelength may be reflected at a smaller angle of diffraction, and light in a relatively long wavelength may be reflected at a larger angle of diffraction.

A large angle of diffraction may indicate that light reflected from the diffraction grating 130 well spreads to a relatively large extent, whereas a small angle of diffraction may indicate that light reflected from the diffraction grating 130 may spread less. Therefore, in the dual resolution spectrometer 100 according to an embodiment of the present inventive concept, as the diffraction grating 130 has an increasing diffraction density, a Dispersion Length (DL) at a certain location from the diffraction grating 130 may increase. The DL may denote a length in which light disperses on a plane perpendicular to a direction in which light diffracted by the diffraction grating 130 at a certain location from the diffraction grating 130 propagates. In FIG. 1, the DL is indicated by bidirectional arrows.

The DL increases farther from the diffraction grating 130. Therefore, the DL may be generally defined at a location of a focusing mirror. For example, in the dual resolution spectrometer 100 according to an embodiment, the DL may be defined at a location of the second mirror 140. As shown in FIG. 1, the DL may be greater than a width of the second mirror 140. Therefore, a portion of light diffracted by the diffraction grating 130 may be incident on the second mirror 140, and a remaining portion of the light may be directed past the second mirror 140 to be incident on the third mirror 150.

For example, when light in broadband having a wavelength ranging from about 150 nm to about 900 nm is incident on the diffraction grating 130, light in a relatively short wavelength region in a range from about 150 nm to about 400 nm may be incident on the third mirror 150, and light in a relatively long wavelength region in a range from about 400 nm to about 900 nm may be incident on the second mirror 140. For reference, the relatively short wavelength region and the relatively long wavelength region may be defined according to various standards. However, in the dual resolution spectrometer 100 according to an embodiment of the present embodiment, a wavelength greater than or equal to about 400 nm is defined as a long wavelength region, and a wavelength less than about 400 nm is defined as a short wavelength region for convenience of explanation.

The second mirror 140 and the third mirror 150 may focus light that is incident from the diffraction grating 130 on an image detection surface of the detector 160. For example, the second mirror 140 and the third mirror 150 may each be a focusing mirror. In an embodiment, each of the second mirror 140 and the third mirror 150 may be any one of a concave mirror, an off axis parabolic mirror, and a toroidal mirror.

In general, a focusing mirror may have a defined focusing length and focus incident light at a focusing position. In the dual resolution spectrometer 100 according to an embodiment, a second focusing length FL2 of the third mirror 150 may be greater than a first focusing length FL1 of the second mirror 140. For example, in an embodiment the second focusing length FL2 of the third mirror 150 may be at least twice as large as the first focusing length FL1 of the second mirror 140. However, embodiments of the present inventive concept are not necessarily limited thereto and relative sizes of focusing lengths of the second mirror 140 and the third mirror 150 may vary from the above numerical range.

In the dual resolution spectrometer 100, a focusing position of the second mirror 140 may be the same as that of the third mirror 150 and may be the image detection surface of the detector 160. Therefore, the third mirror 150 may be located farther from the diffraction grating 130 than the second mirror 140. For example, a second distance D2 between the third mirror 150 and the diffraction grating 130 may be greater than a first distance D1 between the second mirror 140 and the diffraction grating 130. As described above, the third mirror 150 may reflect light in a short wavelength region, such as light in a wavelength region less than about 400 nm, and directs the reflected light to be incident on the detector 160. Also, the second mirror 140 may reflect light in a long wavelength region, such as light in a wavelength region greater than or equal to about 400 nm, and directs the reflected light to be incident on the detector 160. Therefore, the light in the long wavelength region may be focused through the second mirror 140 after traveling the first distance D1, and the light in the short wavelength region may be focused through the third mirror 150 after traveling the second distance D2.

The detector 160 may receive light reflected from the second mirror 140 and the third mirror 150 and form an image on the image detection surface. For example, focal points of the light reflected from the second mirror 140 and the third mirror 150 may be formed on the image detection surface of the detector 160. Locations of focal points on an image detection surface may differ according to wavelengths. For example, on the image detection surface of the detector 160, images may be formed in the first direction (the X direction) by wavelength. In an embodiment, the detector 160 may be, for example, a Charge-Coupled Device (CCD) image sensor or a Complementary Metal Oxide Semiconductor (CMOS) image sensor.

The image detection surface of the detector 160 may be classified into two regions as shown in the graph on the lower right side of FIG. 1. For example, in an embodiment one region may be a long wavelength region, and the other may be a short wavelength region. In an embodiment, the long wavelength region may be a region including a wavelength of light reflected from the second mirror 140 having a wavelength greater than or equal to about 400 nm. Also, the short wavelength region may be a region including a wavelength of light reflected from the third mirror 150 having a wavelength less than about 400 nm.

In the graph shown on the lower right side of FIG. 1, two wavelength regions of the image detection surface may be vertically classified along the Y axis. The Y axis may be a direction perpendicular to a plane in the drawing illustrating the dual resolution spectrometer 100 of FIG. 1. For example, FIG. 1 shows that light in a long wavelength region of the light reflected from the second mirror 140 overlaps light in a short wavelength region of the light reflected from the third mirror 150 in the first direction (e.g., an X direction). However, the light in the long wavelength and the light in the short wavelength region are distinguished from each other (e.g., separated from each other) in the second direction (e.g., a Y direction) perpendicular to the plane shown in FIG. 1 and incident on the image detection surface of the detector 160.

In some embodiments, an order sorting filter may be arranged on an incident surface of the detector 160. The order sorting filter may remove diffracted light other than primary light included in the light reflected from the second mirror 140 and the third mirror 150. Thus, the formation of spots due to the diffracted light other than the primary light on the image detection surface of the detector 160 may be prevented, and spatial resolution and wavelength resolution may be increased accordingly.

The dual resolution spectrometer 100 according to an embodiment may include the diffraction grating 130 having a high grating density and the second mirror 140 and the third mirror 150 that have different focal lengths. The diffraction grating 130 may have a high grating density and diffract incident light in broadband at a relatively great diffraction angle. Accordingly, in the diffraction grating 130, the diffracted light in the broadband may have a large dispersion length, and the light in the long wavelength region may be incident on the second mirror 140 and the light in the short wavelength region may be incident on the third mirror 150. Also, the third mirror 150 having the greater focal length than the second mirror 140 may be arranged farther from the diffraction grating 130 than the second mirror 140. Since light traveling a greater distance may reach the detector 160 through a mirror while spreading in space by as much as the above distance, the wavelength resolution may increase. For example, when comparing an embodiment in which the light in the short wavelength region is reflected from the second mirror 140 arranged in the first distance D1 and incident on the detector 160 with an embodiment of the present inventive concept in which the light in the short wavelength region is reflected from the third mirror 150 arranged in the second distance D2 and incident on the detector 160, the wavelength resolution of the light in the short wavelength region may increase when the short wavelength light is reflected from the third mirror 150 and propagates the second distance D2 that is greater than the first distance D1 to be incident on the detector 160. As a result, the dual resolution spectrometer 100 according to an embodiment of the present inventive concept may increase the wavelength resolution of the light in the short wavelength region. Therefore, the reliability of measuring a semiconductor device by using a spectrometric measurement apparatus including the dual resolution spectrometer 100 may be greatly increased.

Figure 2B:
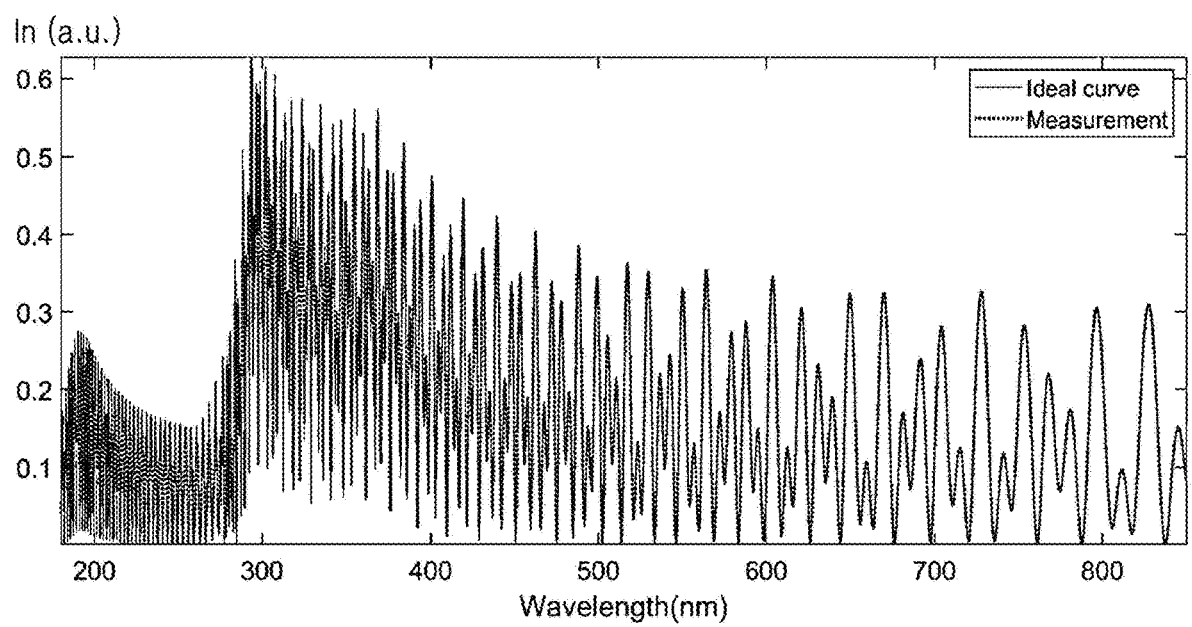
Figure 2C:
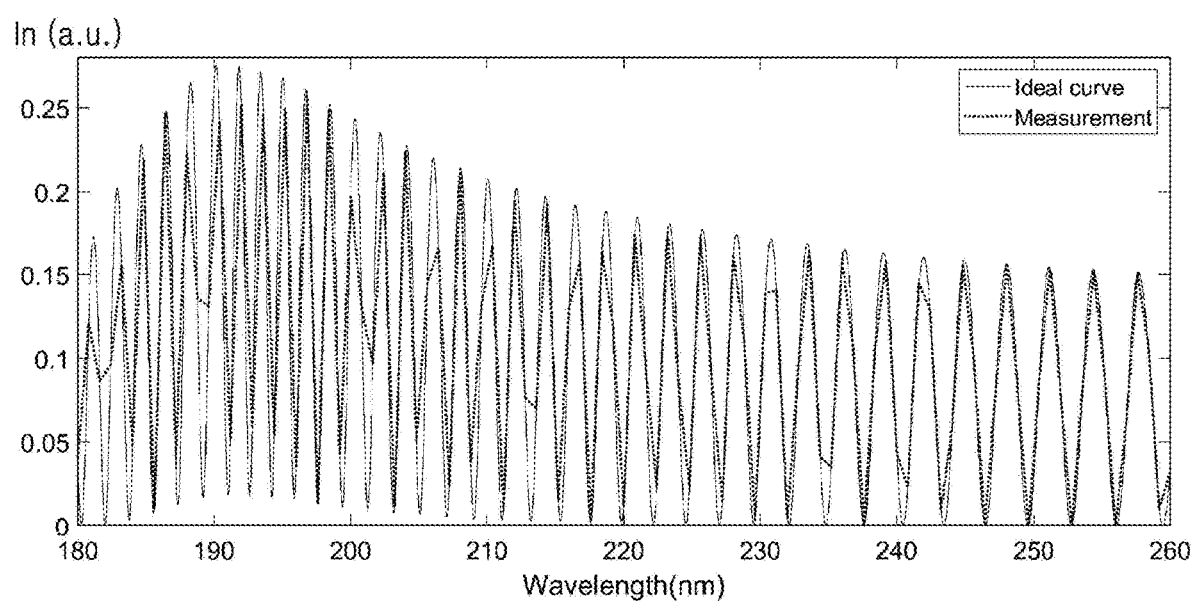
Figure 2D:
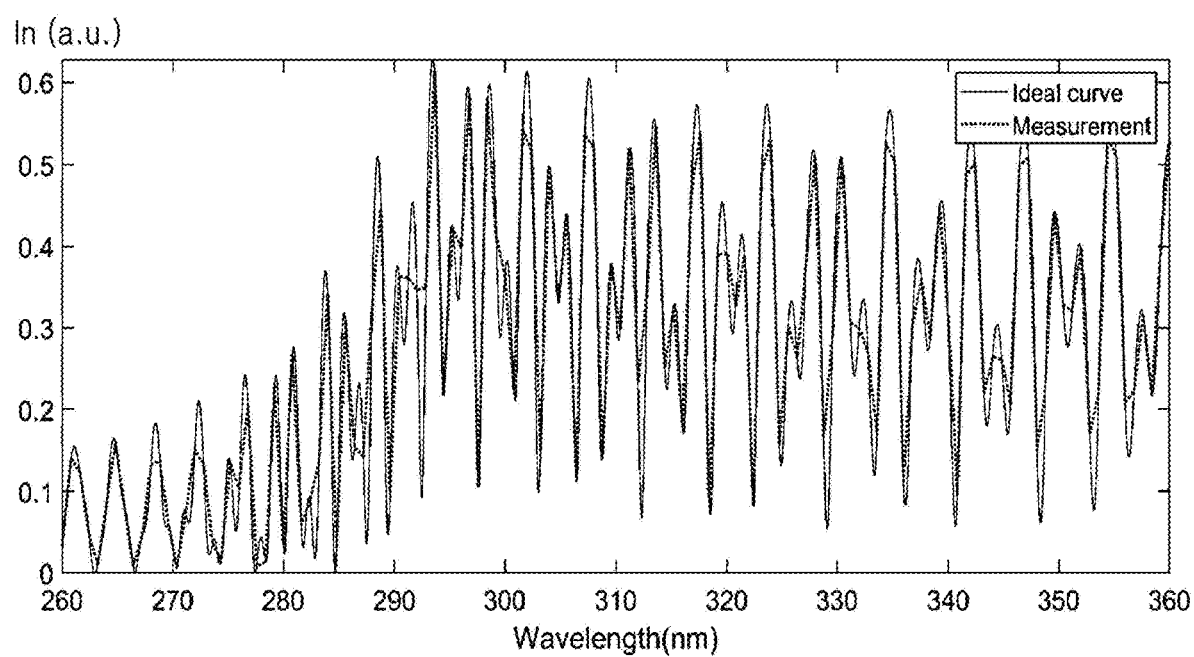

FIG. 2A is a conceptual view of a spectrometer according to a Comparative Example, and FIGS. 2B to 2D are spectrum graphs showing results of measuring a semiconductor device by using the spectrometer of FIG. 2A. In the graphs of FIGS. 2A to 2D, the X axis indicates wavelengths in units of nm, and the Y axis indicates intensity in an arbitrary unit (a.u.). The graphs are described with reference to FIG. 1 as well, and the descriptions already provided with reference to FIG. 1 may be briefly repeated or omitted for economy of description.

Referring to FIGS. 2A to 2D, in a spectrometer Com. according to a Comparative Example, the diffraction grating DG may have a general grating density, and a second mirror M2 may only be arranged as a focusing mirror. For example, the grating density of the diffraction grating DG of the spectrometer Com. according to a Comparative Example may be in a range of about 30% to about 50% as low as a grating density of the diffraction grating 130 of the dual resolution spectrometer 100 according to an embodiment of the present inventive concept. Accordingly, a diffraction angle and a dispersion length of the diffraction grating DG of the spectrometer Com. according to the Comparative Example may be relatively low, and broadband light diffracted by the diffraction grating DG may be entirely incident on the second mirror M2 and reflected. Also, the light reflected from the second mirror M2 may be focused and formed on the image detection surface of the detector Det. On the image detection surface shown on the lower right side of FIG. 2A, the entire broadband light is in one wavelength region.

As described above, the wavelength resolution may increase as the distance that the light propagates increases. However, in the spectrometer Com. according to the Comparative Example shown in FIG. 2A, since light in a short wavelength region is reflected from the second mirror M2 located at a first distance from the diffraction grating DG, the wavelength resolution of the light may be relatively low as compared to an embodiment shown in FIG. 1 in which the light is reflected from the third mirror 150 located at a second distance D2 from the diffraction grating 130 of the dual resolution spectrometer 100.

The spectrum graphs of FIGS. 2B to 2D show spectrums detected by the spectrometer Com. of the Comparative Example. FIG. 2B is a spectrum graph regarding all wavelength bands of light in broadband. FIG. 2C is a spectrum graph showing an enlarged short wavelength region in a range from about 180 nm to about 260 nm. FIG. 2D is a spectrum graph showing an enlarged short wavelength region in a range from about 260 nm to about 360 nm.

In FIGS. 2B to 2D, the solid line indicates a spectrum having an ideal curve, whereas the dashed line indicates a spectrum measured by the spectrometer Com. according to the Comparative Example shown in FIG. 2A. The spectrum having the ideal curve may correspond to a standard spectrum that may be detected when a semiconductor device is measured by a spectrometric measurement apparatus, for example, an SR including a spectrometer with a high wavelength resolution.

For reference, the graphs of FIGS. 2B to 2D are SR spectrum graphs obtained through simulation under the assumption that broadband light is reflected in a stack structure of $SiO_2$/SiN/Si-substrate. It is assumed that a target of a simulation pattern has a mold structure used in a VNAND, the total thickness of a mold is about 120000 Å, and the total thickness of each of $SiO_2$ and SiN is about 60000 Å. The wavelength resolution of the spectrometer Com. according to the Comparative Example is 0.7 nm.

Referring to FIGS. 2C and 2D, it is found that a difference between a spectrum graph with an ideal curve and the measured spectrum graph is relatively large in a short wavelength region. In general, when wavelength resolution in a short wavelength region is not sufficiently secured in the measurement of a multilayer having a large thickness, an oscillation form of a spectrum may not be secured as shown in the spectrum graphs of FIGS. 2C and 2D, and thus, it may be difficult to precisely measure the multilayer.

For reference, in a spectrometric measurement apparatus for measuring a thickness, etc., for example, an SE or an SR, a signal spectrum generally has a wavelength cycle decreasing towards short wavelengths. Also, as a film of a specimen to be measured has an increasing thickness, high-frequency signals are generated, and when a resolution margin is relatively small in the short wavelength region, a shape of the spectrum is damaged, and the measurement precision may degrade accordingly. To overcome the degradation in the measurement precision, a CCD or a CMOS, which is a detector of a spectrometer, is replaced with a product in which pixels or photodiodes (PDs) are highly dense. The detector, however, is one of the most expensive components of the spectrometer, which results in an increase in the price of the spectrometric measurement apparatus. Moreover, although the density of PDs in the detector is approximately doubled, the resolution is increased by only about 40%, and thus, the resolution in the short wavelength region such as deep ultraviolet (DUV) rays may still be insufficient.

Figure 3A:
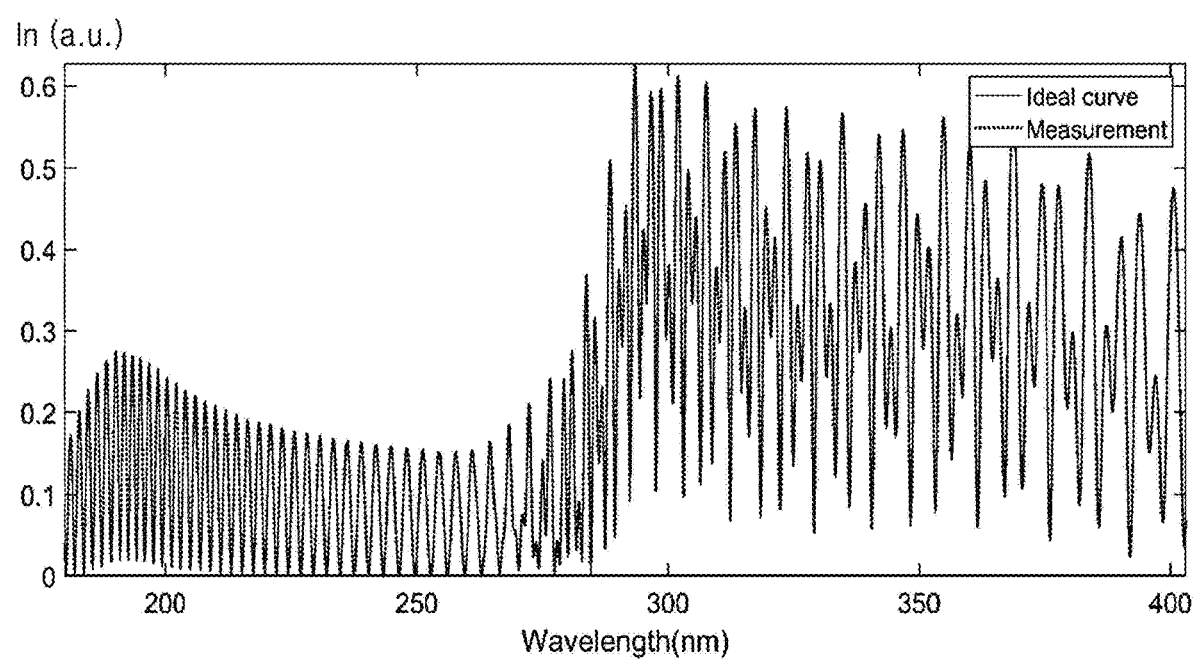
FIGS. 3A and 3B are spectrum graphs showing results of measuring a semiconductor device by using the dual resolution spectrometer of FIG. 1 according to embodiments of the present inventive concept.
Figure 3B:
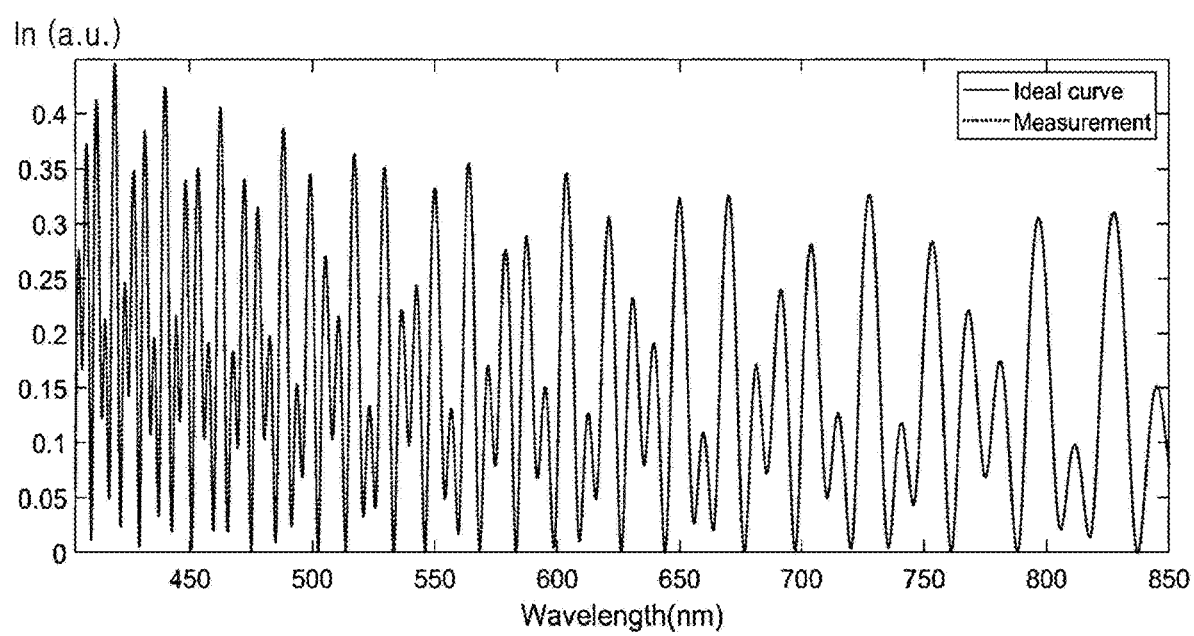

FIGS. 3A and 3B are graphs showing results of measuring a semiconductor device by using the dual resolution spectrometer of FIG. 1. In the graphs of FIGS. 3A and 3B, the X axis indicates wavelengths in units of nm, and the Y axis indicates intensity in an arbitrary unit (a.u.). The graphs of FIGS. 3A and 3B are described with reference to FIG. 1 as well, and the descriptions already provided with reference to FIGS. 1 to 2D may be briefly repeated or omitted for economy of description.

Referring to FIGS. 3A and 3B, the spectrum graphs of FIGS. 3A and 3B show spectrums detected by the dual resolution spectrometer 100 of FIG. 1. FIG. 3A is a spectrum graph showing an enlarged short wavelength region in a range from about 180 nm to about 400 nm and includes a combination of the wavelength ranges shown in the graphs of FIGS. 2C and 2D. FIG. 3B is a spectrum graph showing an enlarged long wavelength region in a range from about 400 nm to about 850 nm. Also, similarly as shown in FIGS. 2B to 2D, a solid line indicates a spectrum with an ideal curve, and a dashed line indicates a spectrum measured by the dual resolution spectrometer 100.

In addition, the graphs of FIGS. 3A and 3B also are SR spectrum graphs obtained through simulation under the assumption that broadband light is reflected in a stack structure including $SiO_2$/SiN/Si-substrate. As in FIGS. 2B to 2D, it is assumed that a target of a simulation pattern has a mold structure used in a VNAND, the total thickness of a mold is about 120000 Å, and the total thickness of each of $SiO_2$ and SiN is about 60000 Å, In the dual resolution spectrometer 100, the grating density of the diffraction grating 130 increases by about 133% compared to that of the diffraction grating DG of the spectrometer Com. according to the Comparative Example, and the pixel density of the detector 160 may be substantially the same as the pixel density of the detector Det. of the spectrometer Com, according to the Comparative Example.

Upon examining the graphs of FIGS. 3A and 3B, it is found that, in all wavelength regions including the short wavelength region, the spectrum graph with the ideal curve is substantially the same as the spectrum graph measured. As a result, in the dual resolution spectrometer 100 according to an embodiment of the present inventive concept, as the wavelength resolution in the short wavelength region is sufficiently secured, an oscillation form of the spectrum in the short wavelength region may be intactly obtained, and thus, a precise measurement may be performed on a multilayer.

In the spectrum graph of FIG. 3A, the wavelength resolution is about 0.21 nm in the dual resolution spectrometer 100 according to an embodiment, which is increased by about 333% compared to the wavelength resolution of the spectrometer Com. of the Comparative Example that is about 0.7 nm. Also, in the spectrum graph of FIG. 3B, the wavelength resolution is about 0.42 nm, which is increased by about 167% compared to the wavelength resolution of the spectrometer Com. of the Comparative Example that is about 0.7 nm. In addition, as an angle of diffraction of the diffraction grating 130 increases, although light in a long wavelength region travels the same first distance D1, the light is dispersed more than in the spectrometer Com. of the Comparative Example, which results in an increase in the wavelength resolution in the long wavelength region.

The dual resolution spectrometer 100 according to an embodiment of the present inventive concept may increase the wavelength resolution in the short wavelength region by at least about three to about four times by replacing the diffraction grating 130 and adding an additional third mirror 150. Therefore, by applying the dual resolution spectrometer 100 according to an embodiment of the present inventive concept to a spectrometric measurement apparatus, the price of the spectrometric measurement apparatus may not greatly increase, and a semiconductor device may be precisely measured based on high wavelength resolution. The spectrometric measurement apparatus including the dual resolution spectrometer 100 may be useful as, for example, a thickness measurement apparatus for a next-generation VNAND that is cost effective.

Figure 4:
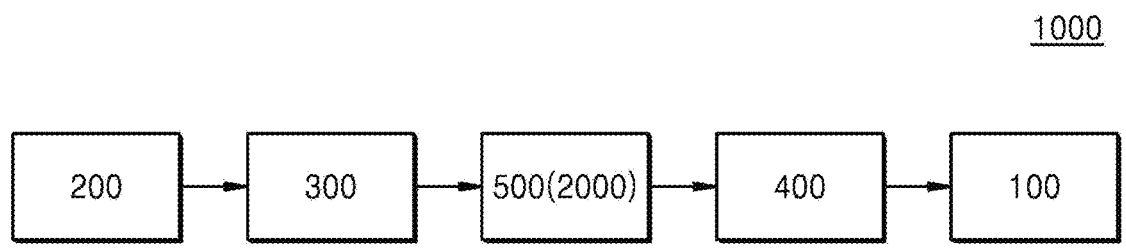
FIG. 4 is a block diagram of a spectrometric measurement apparatus including a dual resolution spectrometer, according to an embodiment of the present inventive concept.

FIG. 4 is a block structure diagram of a spectrometric measurement apparatus including a dual resolution spectrometer, according to an embodiment. The block structure diagram of FIG. 4 is described with reference to FIG. 1 as well, and the descriptions already provided with reference to FIGS. 1 to 3B may be briefly repeated or omitted for economy of description.

Referring to FIG. 4, a spectrometric measurement apparatus 1000 including a dual resolution spectrometer according to an embodiment of the present inventive concept (hereinafter, simply referred to as 'spectrometric measurement apparatus') may include a light source 200, an illumination optical system 300, a stage 500, an imaging optical system 400, and a dual resolution spectrometer 100.

The light source 200 may be a broadband light source that generates and irradiates broadband light. For example, light from the light source 200 may be light of various colors including light in multiple wavelength regions. For example, in the spectrometric measurement apparatus 1000 according to an embodiment of the present inventive concept, the light source 200 may generate and irradiate light in a wavelength range from about 170 nm to about 2100 nm. The wavelength range of the light generated by the light source 200 is not necessarily limited to the above numerical range. In an embodiment, the light source 200 may be a halogen lamp light source or a light-emitting diode (LED) light source that generates light in a continuous spectrum. However, the types of the light source 200 are not necessarily limited thereto. For example, as the light source 200 is realized as a broadband light source, various spectrums may be configured.

The illumination optical system 300 may allow the light from the light source 200 to be irradiated onto a measurement target 2000 arranged on the stage 500. Components of the illumination optical system 300 are described in more detail with reference to FIGS. 5 and 6.

The stage 500 is a device on which the measurement target 2000 is arranged and supported. In an embodiment, the stage 500 may move the measurement target 2000 through straight and rotational movement. For example, in an embodiment the stage 500 may be realized as an R-θ stage or an x-y-z stage. For reference, the R-θ stage may move the measurement target 2000 through straight and rotational movement, and the x-y-z stage may move the measurement target 2000 only through straight movement.

The imaging optical system 400 may emit light reflected from the measurement target 2000 in a direction towards the dual resolution spectrometer 100. Components of the imaging optical system 400 are described in more detail with reference to FIGS. 5 and 6.

The dual resolution spectrometer 100 may be, for example, the dual resolution spectrometer of FIG. 1. Therefore, the dual resolution spectrometer 100 may include the slit plate 110, the first mirror 120, the diffraction grating 130, the second mirror 140, the third mirror 150, and the detector 160. The dual resolution spectrometer 100 may disperse broadband light reflected from the measurement target 2000 and classify the broadband light into two wavelength regions to detect the broadband light with different resolution.

In an embodiment, the spectrometric measurement apparatus 1000 may further include a Central Processing Unit (CPU), memory, and the like. The CPU may execute programs stored in the memory and thus control each component of the spectrometric measurement apparatus 1000. For example, the CPU may execute the programs stored in the memory and thus allow the spectrometric measurement apparatus 1000 to measure the measurement target 2000 based on a spectrum of the broadband light reflected from the measurement target 2000. For example, as the CPU executes the programs stored in the memory, the spectrometric measurement apparatus 1000 may measure the measurement target 2000, such as a wafer.

The spectrometric measurement apparatus 1000 according to an embodiment of the present inventive concept may include the dual resolution spectrometer 100. Also, the dual resolution spectrometer 100 may include the diffraction grating 130 with a high grating density, and the second mirror 140 and the third mirror 150 that have different focal lengths. Therefore, the dual resolution spectrometer 100 may increase the wavelength resolution of the light in the short wavelength region by using the diffraction grating 130 and the third mirror 150. As a result, the spectrometric measurement apparatus 1000 according to an embodiment of the present inventive concept may precisely measure a semiconductor device based on the high wavelength resolution of the dual resolution spectrometer 100.

Figure 5:
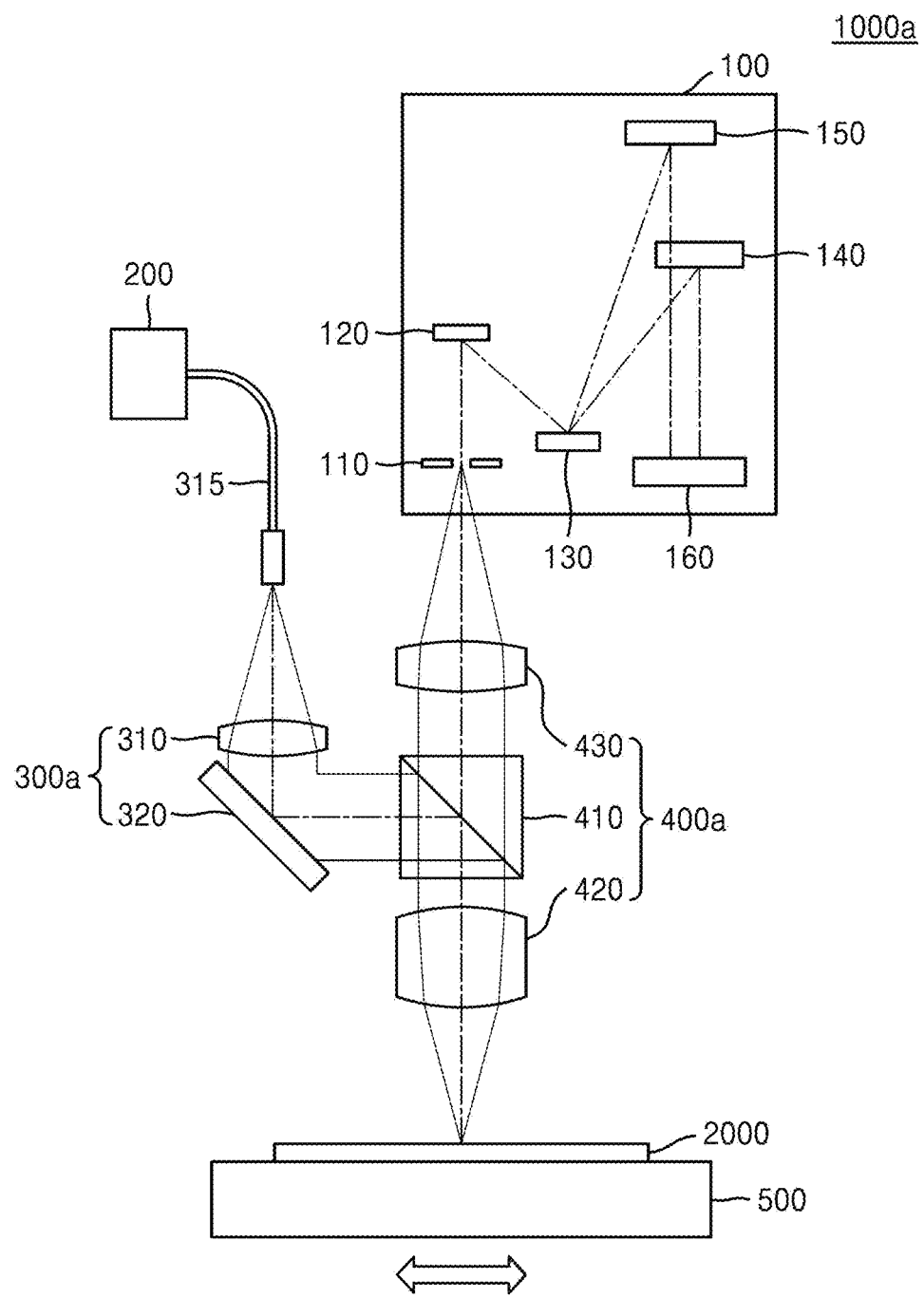
FIG. 5 is a conceptual view of a Spectroscopic Reflectometer (SR) as a spectrometric measurement apparatus including a dual resolution spectrometer, according to an embodiment of the present inventive concept.

FIG. 5 is a conceptual view of an SR as a spectrometric measurement apparatus including a dual resolution spectrometer, according to an embodiment. The descriptions already provided with reference to FIG. 4 may be briefly repeated or omitted for economy of description.

Referring to FIG. 5, a spectrometric measurement apparatus 1000a according to an embodiment of the present inventive concept may include the light source 200, an illumination optical system 300a, an imaging optical system 400a, the stage 500, and the dual resolution spectrometer 100. For example, the spectrometric measurement apparatus 1000a may be an SR.

In an embodiment, the light source 200 may be a broadband light source that generates and irradiates broadband light (e.g., light covering a large range of wavelengths). For example, in the spectrometric measurement apparatus 1000a, the light source 200 may generate and irradiate light in a wavelength range from about 170 nm to about 2100 nm. However, embodiments of the present inventive concept are not necessarily limited thereto and the wavelength range of the light generated by the light source 200 may vary from the above numerical range.

The illumination optical system 300a may include a condenser lens 310 and a mirror 320. The illumination optical system 300a may direct the light from the light source 200 to be irradiated onto the measurement target 2000 arranged on the stage 500 through the condenser lens 310 and the mirror 320. In an embodiment, the light from the light source 200 may be transmitted to the illumination optical system 300a through optical fibers 315. According to an embodiment, the optical fibers 315 may be included in the illumination optical system 300a. In some embodiments, the illumination optical system 300a may further include a collimator that changes light into collimated light.

The imaging optical system 400a may include a beam splitter 410, an objective lens 420, and an imaging lens 430. The beam splitter 410 may direct light to be incident on the measurement target 2000 and emit light reflected from the measurement target 2000 in a direction towards the dual resolution spectrometer 100. For example, the beam splitter 410 may transmit or reflect incident light from the illumination optical system 300a to direct the incident light to be incident on the measurement target 2000 and may reflect or transmit the reflected light from the measurement target 2000 to be irradiated in the direction towards the dual resolution spectrometer 100.

The objective lens 420 may condense light from the beam splitter 410 to the measurement target 2000 and make the light be incident thereto. For example, in an embodiment the objective lens 420 may be arranged above the measurement target 2000 to form a focal point of the light on a surface of the measurement target 2000. Also, the objective lens 420 may direct light reflected from the measurement target 2000 to be incident on the beam splitter 410. For example, the objective lens 420 may convert the reflected light from the measurement target 2000 into collimated light and direct the collimated light to be incident on the beam splitter 410.

The imaging lens 430 may condense the light from the beam splitter 410 and direct the condensed light to be incident on the slit S in the slit plate 110 of the dual resolution spectrometer 100. The imaging lens 430 may be arranged on an incident surface of the dual resolution spectrometer 100 and condense the light from the beam splitter 410 to the slit S in the slit plate 110. According to an embodiment, at least one mirror may be arranged between the beam splitter 410 and the imaging lens 430. A path of the light may change by adding a mirror, and thus, a degree of freedom of a location of the dual resolution spectrometer 100 may increase, and the total size of the spectrometric measurement apparatus 1000a may be reduced.

The beam splitter 410 and the objective lens 420 may also be included in the illumination optical system 300a such that the light is incident on the measurement target 2000. For example, the beam splitter 410 and the Objective lens 420 may be shared by the illumination optical system 300a and the imaging optical system 400a.

The stage 500 is a device on which the measurement target 2000 is arranged and supported. In an embodiment, the stage 500 may be an R-θ stage or an x-y-z stage. For reference, the measurement target 2000 may be various devices, such as a wafer, a semiconductor package, a semiconductor chip, a display panel, or the like, which are subject to measurement. However, embodiments of the present inventive concept are not necessarily limited thereto. For example, in the spectrometric measurement apparatus 1000a, the measurement target 2000 may be a wafer. In an embodiment, the wafer may be, for example, a VNAND having multiple thin films formed on a substrate. In an embodiment, features of the measurement target 2000 measured by the spectrometric measurement apparatus 1000a may be, for example, thicknesses of thin films on the measurement target 2000, pattern forms of thin films, a Critical Dimension (CD), or the like. However, embodiments of the present inventive concept are not necessarily limited thereto and the features of the measurement target 2000 that are measured may vary.

The dual resolution spectrometer 100 may be the dual resolution spectrometer 100 of FIG. 1. Therefore, the dual resolution spectrometer 100 may include the slit plate 110, the first mirror 120, the diffraction grating 130, the second mirror 140, the third mirror 150, and the detector 160. The dual resolution spectrometer 100 may disperse broadband light reflected from the measurement target 2000 and classify the broadband light into two wavelength regions to detect the broadband light with different resolution.

Figure 6:
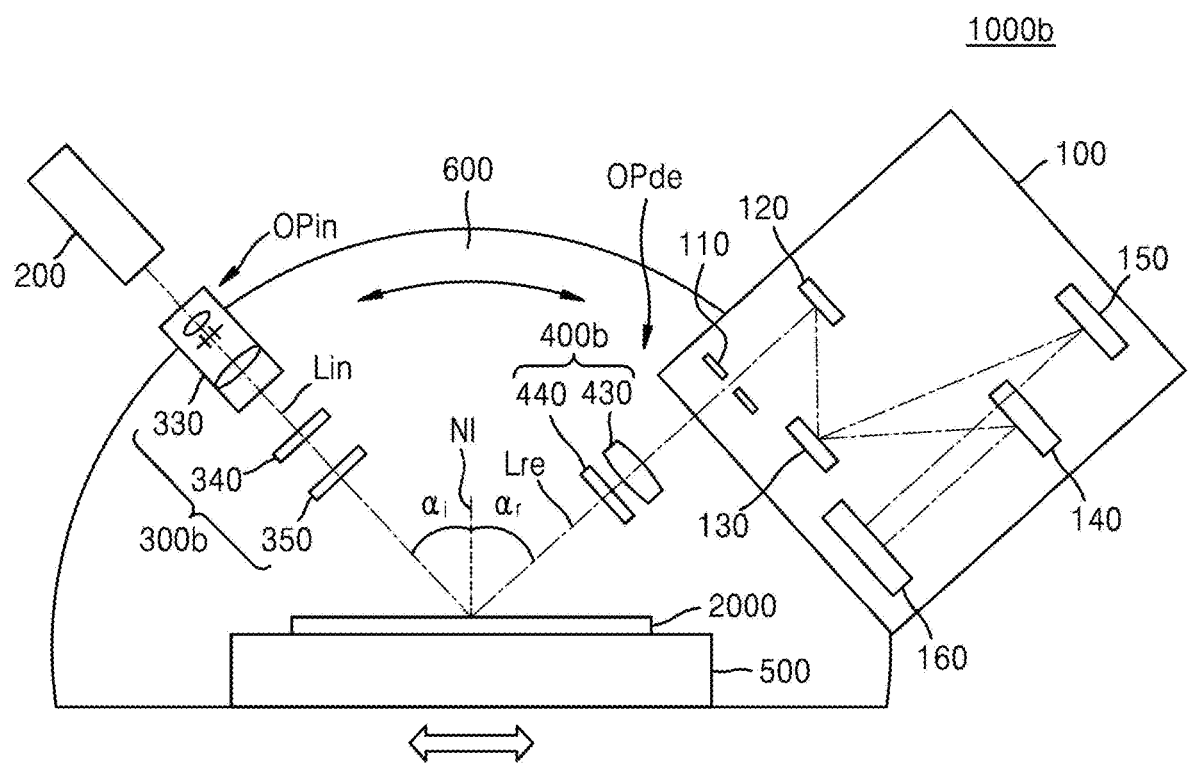
FIG. 6 is a conceptual view of a Spectroscopic Ellipsometer (SE) as a spectrometric measurement apparatus including a dual resolution spectrometer, according to an embodiment of the present inventive concept.

FIG. 6 is a conceptual view of an SE as a spectrometric measurement apparatus including a dual resolution spectrometer, according to an embodiment. The descriptions already provided with reference to FIG. 4 may be briefly repeated or omitted for economy of description.

Referring to FIG. 6, a spectrometric measurement apparatus 1000b according to an embodiment may include the light source 200, an illumination optical system 300b, an imaging optical system 400b, the stage 500, a linear stand 600, and the dual resolution spectrometer 100. The spectrometric measurement apparatus 1000b according to an embodiment may be, for example, an SE. For reference, an optical system that directs light from the light source 200 to the measurement target 2000 is referred to as an incident optical system OPin, and an optical system that collects reflected light from the measurement target 2000 is referred to as a detection optical system OPde. In the spectrometric measurement apparatus 1000b, the illumination optical system 300b may correspond to the incident optical system OPin, and the imaging optical system 400b and the dual resolution spectrometer 100 may correspond to the detection optical system OPde.

In an embodiment, the light source 200 may be a broadband light source that generates and irradiates broadband light. For example, in the spectrometric measurement apparatus 1000b, the light source 200 may generate and irradiate light in a wavelength range from about 170 nm to about 2100 nm. However, embodiments of the present inventive concept are not necessarily limited thereto and the wavelength range of the light generated by the light source 200 may vary from the above numerical range.

In an embodiment, the illumination optical system 300b may include a beam collimator 330, a linear polarizer 340, and a compensator 350. The beam collimator 330 may change the light from the light source 200 into collimated light and irradiate the same. The linear polarizer 340 may perform linear polarization on the light from the beam collimator 330 and irradiate the linearly polarized light. For example, the linear polarizer 340 may only penetrate and output a p polarization component (e.g., a horizontal component) or an s polarization component (e.g., a vertical component) of the incident light and thus may linearly polarize the incident light.

In an embodiment, the compensator 350 may circularly or elliptically polarize light from the linear polarizer 340 and output the circularly or elliptically polarized light. The compensator 350 may put a phase difference on the polarized light to change straight polarization into circular polarization or elliptical polarization, or circular polarization into straight polarization. Thus, the compensator 350 is referred to as a phase retarder. For example, in an embodiment the compensator 350 may be a quarter-wave plate. However, embodiments of the present inventive concept are not necessarily limited thereto.

In an embodiment, the imaging optical system 400b may include a polarization analyzer 440 and the imaging lens 430. The polarization analyzer 440 may selectively pass light reflected from the measurement target 2000 and having a changed polarization direction. For example, the polarization analyzer 440 may be a linear polarizer that only passes specific polarization components of incident light and blocks other polarization components.

For reference, like the spectrometric measurement apparatus 1000b, a system including the linear polarizer 340, the compensator 350, and the polarization analyzer 440 is called a polarizer-compensator-sample-analyzer (PCSA) ellipsometry system. Here, P indicates a linear polarizer, C indicates a compensator, S indicates a sample, and A indicates a polarization analyzer. However, embodiments of the spectrometric measurement apparatus 1000b are not necessarily limited to a PCSA ellipsometry system. For example, in some embodiments, the spectrometric measurement apparatus 1000b may be a PSA ellipsometry system, a PSCA ellipsometry system, or a PCSCA ellipsometry system. Furthermore, the spectrometric measurement apparatus 1000b may include a phase modulator instead of the compensator 350, In an embodiment in which a phase modulator is used, mechanical jitter is removed to obtain accurate and stable examination results.

The imaging lens 430 may condense light from the polarization analyzer 440 and direct the condensed light to be incident on the slit S in the slit plate 110 of the dual resolution spectrometer 100. The imaging lens 430 may be arranged on an incident surface of the dual resolution spectrometer 100 and focus the light from the beam splitter 410 to the slit S in the slit plate 110. According to an embodiment, at least one mirror may be arranged between the beam splitter 410 and the imaging lens 430. A path of the light may be changed by adding a mirror as described above, and thus, a degree of freedom of a location of the dual resolution spectrometer 100 may increase, and the total size of the spectrometric measurement apparatus 1000b may be reduced.

The stage 500 is a device on which the measurement target 2000 is arranged and supported. In an embodiment, the stage 500 may be an R-θ stage or an x-y-z stage. In an embodiment, the stage 500 may be electrically moved by a motor. As the measurement target 2000 is moved by the stage 500, the measurement target 2000 may be measured at a required location. In an embodiment, the measurement target 2000 may be various devices, such as a wafer, a semiconductor package, a semiconductor chip, a display panel, or the like, which are subject to measurement. However, embodiments of the present inventive concept are not necessarily limited thereto. For example, in the spectrometric measurement apparatus 1000b, the measurement target 2000 may be a wafer. A standard wafer with no defects may be arranged on the stage 500 and used to obtain null conditions of the spectrometric measurement apparatus 1000b that is an SE.

In an embodiment, the null conditions may be calculated by an additional detector. When a method of obtaining the null conditions is briefly described, in a sample with no defects, such as a wafer with no defects, the linear polarizer 340, the compensator 350, and the polarization analyzer 440 are rotated at a certain angle, and the intensity of light collected by the additional detector is measured, based on elliptical polarization. When rotation angles of the linear polarizer 340, the compensator 350, and the polarization analyzer 440 with respect to an optical axis, that is, the azimuth, are expressed as P, C, and A, respectively, the rotation angles of the linear polarizer 340, the compensator 350, and the polarization analyzer 440 are measured three to four times while changing the rotation angles. Elliptical polarization parameters of a sample, and Δ, are then obtained, and null conditions for blocking reference light incident on the additional detector may be obtained based on the elliptical polarization parameters. Here, ψ is a parameter regarding p polarization and s polarization, and Δ is a parameter regarding phase retardation. In an embodiment, the null conditions may indicate certain rotation angles of the linear polarizer 340, the compensator 350, and the polarization analyzer 440 to block reference light. In a null condition state, the reference light may be completely blocked by the polarization analyzer 440, and thus, the reference light incident on the additional detector may all disappear. In some embodiments, however, the reference light may not be completely blocked by the polarization analyzer 440 in the null condition state and may be incident on the additional detector to a minimum extent.

The measurement target 2000 is then measured by using the spectrometric measurement apparatus 1000b in the null condition state. When the measurement target 2000 does not have defects, the reference light may be completely or mostly blocked by the polarization analyzer 440, and thus, an intensity that is the same as that of a sample may be measured. On the contrary, when the measurement target 2000 has defects, light that is changed because of the defects may pass through the polarization analyzer 440 and be incident on the dual resolution spectrometer 100. In some embodiments, the defects may be errors in a thickness of a thin film of the measurement target 2000, a pattern CD, and the like. In some cases, the defects may include the presence of external foreign materials.

The linear stand 600 may support the incident optical system OPin and the detection optical system OPde. The linear stand 600 may rotate the incident optical system OPin and the detection optical system OPde to enable incident light Lin and reflected light Lre to move at the same angle with respect to a normal line NI on an upper surface of the measurement target 2000. For example, as indicated by a bi-directional thick arrow, the linear stand 600 may adjust an incident angle $\alpha_1$ by rotating the incident optical system OPin according to characteristics of a measurement target or a sample and adjust the detection optical system OPde to be located at a reflection angle having the same degree.

In the spectrometric measurement apparatus 1000b, as the rotation angles of the linear polarizer 340, the compensator 350, and the polarization analyzer 440 with respect to an optical axis, such as the azimuth, are adjusted, the null conditions that the reference light is blocked by the polarization analyzer 440 may be set. The reference light may be light reflected from a reference sample with no defects, for example, a normal wafer with no defects.

In an embodiment, to adjust the rotation angles with respect to the optical axis, the linear polarizer 340, the compensator 350, and the polarization analyzer 440 may be installed on a motor-driven rotation support and rotated around the optical axis. The rotation of the linear polarizer 340, the compensator 350, and the polarization analyzer 440 may be continuous rotation during which the linear polarizer 340, the compensator 350, and the polarization analyzer 440 continuously spin or may be discontinuous rotation during which the linear polarizer 340, the compensator 350, and the polarization analyzer 440 are rotated at fixed angles. For example, in the spectrometric measurement apparatus 1000b, the rotation of the linear polarizer 340, the compensator 350, and the polarization analyzer 440 may be discontinuous rotation.

The linear polarizer 340 and the polarization analyzer 440 may each be realized as a static linear polarizer of a wire-grid type or a Glan-Thompson type. However, the types are not limited thereto, and the linear polarizer 340 and the polarization analyzer 440 may each be realized as an electronic device, for example, a Faraday rotator, which may change a polarization direction in response to electrical signals. Also, the compensator 350 may be replaced with an electronic device, for example, a Piezoelectric phase modulator, which is controlled in response to electrical signals. When the linear polarizer 340, the compensator 350, and the polarization analyzer 440 each are realized as an electronic device, the above motor-driven rotation support may be omitted.

The dual resolution spectrometer 100 may be the dual resolution spectrometer 100 of FIG. 1, Therefore, the dual resolution spectrometer 100 may include the slit plate 110, the first mirror 120, the diffraction grating 130, the second mirror 140, the third mirror 150, and the detector 160. The dual resolution spectrometer 100 may disperse broadband light reflected from the measurement target 2000 and separate the broadband light into two wavelength regions to detect the broadband light with different resolution.

Figure 7A:
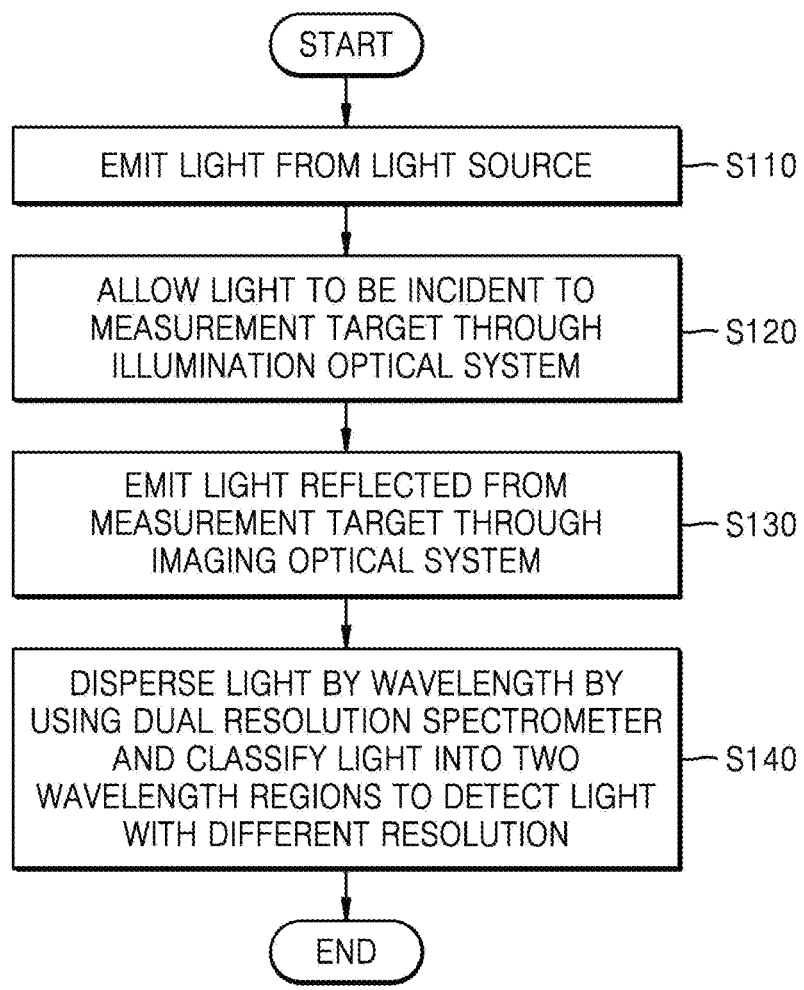
FIG. 7A is a schematic flowchart of a spectrometric measurement method according to an embodiment of the present inventive concept.

FIG. 7A is a schematic flowchart of a spectrometric measurement method according to an embodiment. The flowchart is described with reference to FIGS. 1 and 4 as well, and the descriptions already provided with reference to FIGS. 1 to 6 may be briefly repeated or omitted for economy of explanation.

Referring to FIG. 7A, according to a spectrometric measurement method using a dual resolution spectrometer (hereinafter, simply referred to as 'spectrometric measurement method'), light may be generated first by the light source 200 and then emitted in operation S110. In an embodiment, the light may be broadband light. For example, the light may have a wavelength range of about 170 nm to about 2100 nm. However, embodiments of the present inventive concept are not necessarily limited thereto and the wavelength range of the light may vary from the above numerical range.

In operation S120, the light from the light source 200 may be incident on the measurement target 2000 through the illumination optical system 300. The illumination optical system 300 may include various components according to the spectrometric measurement apparatus used in the spectrometric measurement method according to an embodiment of the present inventive concept. For example, in an embodiment in which the spectrometric measurement apparatus 1000 is an SE, the illumination optical system 300 may include the condenser lens 310 and the mirror 320. Also, in an embodiment in which the spectrometric measurement apparatus 1000 is an SR, the illumination optical system 300 may include the beam collimator 330, the linear polarizer 340, and the compensator 350.

In operation S130, light reflected from the measurement target 2000 is then irradiated onto the dual resolution spectrometer 100 through the imaging optical system 400. The imaging optical system 400 may include various components according to the spectrometric measurement apparatus used in the spectrometric measurement method according to an embodiment of the present inventive concept. For example, in an embodiment in which the spectrometric measurement apparatus 1000 is an SE, the imaging optical system 400 may include the beam splitter 410, the objective lens 420, the imaging lens 430, and the like. Also, in an embodiment in which the spectrometric measurement apparatus 1000 is an SR, the imaging optical system 400 may include the polarization analyzer 440 and the imaging lens 430.

In operation S140, the light may be dispersed by the dual resolution spectrometer 100 according to wavelength, and the dispersed light may be separated into two wavelength regions and detected with different resolution. In an embodiment, the dual resolution spectrometer 100 may include the slit plate 110, the first mirror 120, the diffraction grating 130, the second mirror 140, the third mirror 150, and the detector 160. Functions of the components of the dual resolution spectrometer 100 are the same as those described above with reference to FIG. 1. Processes of dispersing light by using the dual resolution spectrometer 100 and detecting the light with different resolution are described in more detail with reference to FIG. 7B below.

Figure 7B:
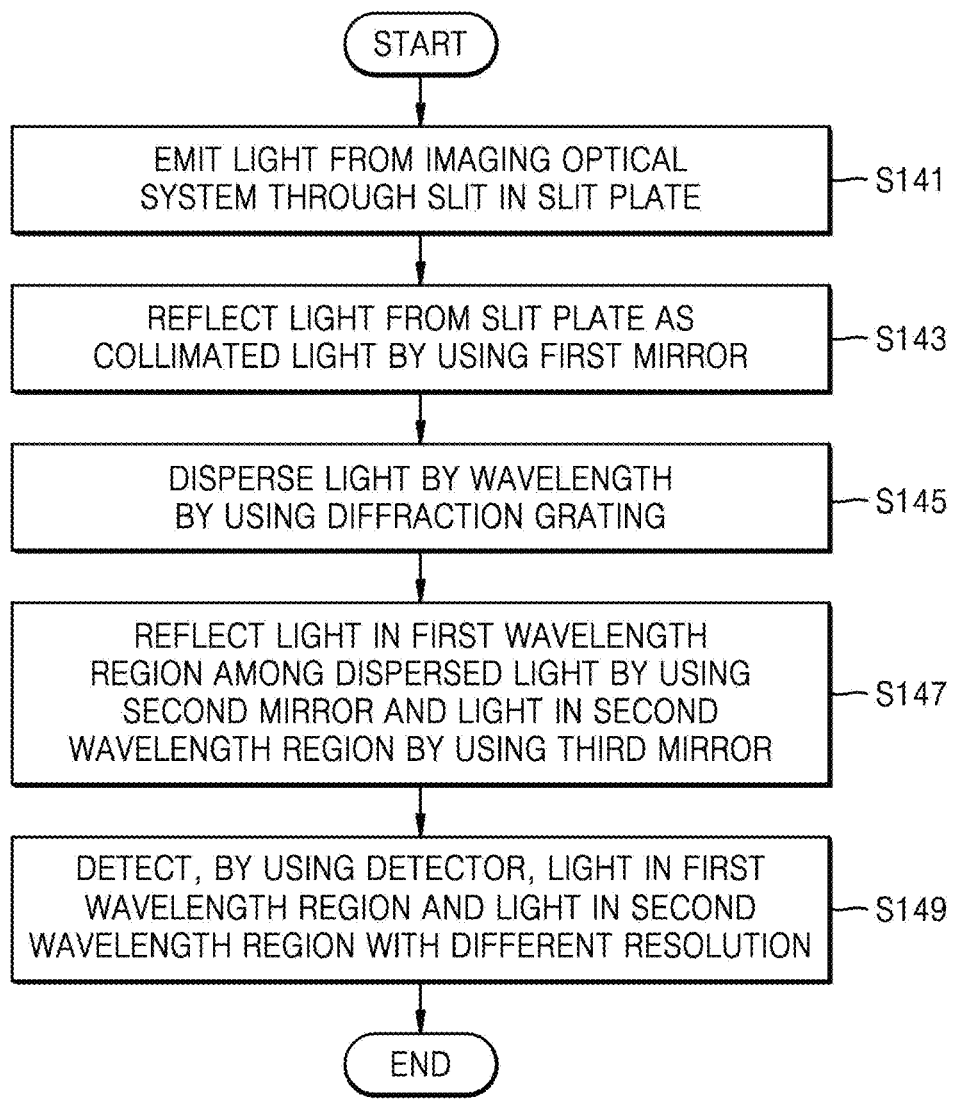
FIG. 7B is a flowchart showing in more detail an operation of separating light in the spectrometric measurement method of FIG. 7A according to an embodiment of the present inventive concept.

FIG. 7B is a flowchart showing in more detail an operation of separating light in the spectrometric measurement method of FIG. 7A. The flowchart is described with reference to FIG. 1 as well, and the descriptions already provided with reference to FIG. 7A may be briefly repeated or omitted for economy of description.

Referring to FIG. 7B, in operation S141 of detecting the light with different resolution, the light from the imaging optical system 400 may be emitted through the slit S in the slit plate 110. The light emitted through the slit S may be dispersed and propagated towards the first mirror 120.

In operation S143, the light from the slit S may then be changed into collimated light through the first mirror 120 and reflected. In an embodiment, the first mirror 120 may be, for example, a collimation mirror. The light reflected from the first mirror 120 may be incident on the diffraction grating 130 in the form of collimated light.

In operation S145, the light may be dispersed by the diffraction grating 130 according to wavelength. As described above, the diffraction grating 130 may have a high grating density, for example, a grating density that is in a range of about 130% to about 150% of the diffraction grating DG of the spectrometer Com. of the Comparative Example, and may diffract the broadband light at a relatively large angle of diffraction. Accordingly, the light diffracted by the diffraction grating 130 may be separated into two wavelength regions, and the separated light may be incident on two mirrors, such as the second mirror 140 and the third mirror 150. For example, in an embodiment the two wavelength regions may be a short wavelength region less than about 400 nm, and a long wavelength region greater than or equal to about 400 nm.

Light in a first wavelength region among the dispersed light may then be reflected from the second mirror 140, and light in a second wavelength region may be reflected from the third mirror 150. The first wavelength region may be the long wavelength region, and the second wavelength region may be the short wavelength region. Therefore, the light in the long wavelength region may be reflected from the second mirror 140, and the light in the short wavelength region may be reflected from the third mirror 150. The second mirror 140 and the third mirror 150 may each be a focusing mirror and have different focal lengths. Therefore, the second mirror 140 and the third mirror 150 may be positioned at different distances from the diffraction grating 130.

In operation S149, the light in the first wavelength region and the light in the second wavelength region may be detected by the detector with different resolution. The light in the first wavelength region and the light in the second wavelength region are detected with different resolution because the light in the second wavelength region is reflected from the third mirror 150, which is located farther from the diffraction grating 130 than the second mirror 140, and is incident on the detector 160.

While the present inventive concept has been particularly shown and described with reference to embodiments thereof, it will be understood that various changes in form and details may be made therein without departing from the spirit and scope of the present inventive concept.

What is claimed is:

1. A dual resolution spectrometer comprising:
   a slit plate comprising a slit receiving light reflected from a measurement target, the slit plate directing the light reflected from the measurement target to a first mirror;
   the first mirror reflecting light from the slit to a diffraction grating;
   the diffraction grating dispersing light from the first mirror according to a wavelength of the light from the first mirror, wherein the diffraction grating solely directs light in a first wavelength region among the light dispersed by the diffraction grating to a second mirror and solely directs light in a second wavelength region among the light dispersed by the diffraction grating to a third mirror, the second wavelength region does not overlap the first wavelength region;
   the second mirror reflecting the light in the first wavelength region among the light dispersed by the diffraction grating to a detector;
   the third mirror reflecting the light in the second wavelength region among the light dispersed by the diffraction grating to the detector; and
   the detector detecting the light in the first wavelength region and the light in the second wavelength region with different resolutions from each other,
   wherein the third mirror is positioned farther from the diffraction grating and the detector than the second mirror.

2. The dual resolution spectrometer of claim 1, wherein:
   the light reflected from the measurement target comprises broadband light;
   the first wavelength region comprises a relatively long wavelength region; and
   the second wavelength region comprises a relatively short wavelength region.

3. The dual resolution spectrometer of claim 1, wherein:
   the light reflected from the measurement target comprises broadband light;
   the first wavelength region has a wavelength greater than or equal to about 400 nm; and
   the second wavelength region has a wavelength less than about 400 nm.

4. The dual resolution spectrometer of claim 1, wherein the diffraction grating disperses the light from the first mirror so that the light in the first wavelength region is incident on the second mirror and the light in the second wavelength region is directed past the second mirror to be incident on the third mirror.

5. The dual resolution spectrometer of claim 1, wherein the first mirror comprises a collimation mirror that reflects light from the slit as collimated light.

6. The dual resolution spectrometer of claim 1, wherein: the second mirror and the third mirror have different focal lengths from each other, each of the second and third mirrors comprising a focusing mirror focusing light on an image detection surface of the detector; and the second mirror and the third mirror each comprise any one of a concave mirror, an off-axis parabolic mirror, and a toroidal mirror.

7. The dual resolution spectrometer of claim 1, wherein the detector includes an image detection surface having a long-wavelength detection region corresponding to the light from the second mirror and a short-wavelength detection region corresponding to the light from the third mirror, the long-wavelength detection region and the short-wavelength detection region are spaced apart from each other.

8. The dual resolution spectrometer of claim 7, wherein a resolution in the short-wavelength detection region is greater than a resolution in the long-wavelength detection region.

9. A spectrometric measurement apparatus comprising:
   a light source emitting broadband light;
   an illumination optical system directing the broadband light from the light source to be incident on a measurement target;
   an imaging optical system emitting light reflected from the measurement target to a dual resolution spectrometer; and
   the dual resolution spectrometer dispersing light from the imaging optical system according to wavelength of the light from the imaging optical system and directing the dispersed light into two wavelength regions to detect the dispersed light in the two wavelength regions with different resolutions from each other,
   wherein the dual resolution spectrometer solely directs light in a first wavelength region to a second mirror and solely directs light in a second wavelength region to a third mirror, the second wavelength region does not overlap the first wavelength region.

10. The spectrometric measurement apparatus of claim 9, wherein the dual resolution spectrometer comprises:
    a slit plate comprising a slit receiving the light emitted from the imaging optical system and directing the light emitted from the imaging optical system to a first mirror;
    the first mirror reflecting light from the slit to a diffraction grating;
    the diffraction grating dispersing light from the first mirror according to a wavelength of the light from the first mirror wherein the diffraction grating directs light in the first wavelength region among the light dispersed by the diffraction grating to the second mirror and directs light in the second wavelength region among the light dispersed by the diffraction grating to the third mirror;
    the second mirror reflecting the light in the first wavelength region from among the light dispersed by the diffraction grating to a detector;
    a third mirror reflecting the light in the second wavelength region from among the light dispersed by the diffraction grating to the detector; and
    the detector detecting the light in the first wavelength region and the light in the second wavelength region with different resolutions from each other.

11. The spectrometric measurement apparatus of claim 10, wherein:
    the first wavelength region comprises a relatively long wavelength region; and
    the second wavelength region comprises a relatively short wavelength region.

12. The spectrometric measurement apparatus of claim 10, wherein:

the second mirror and the third mirror each comprise a focusing mirror focusing light on an image detection surface of the detector; and the third mirror has a greater focal length and is positioned farther from the diffraction grating than the second mirror.

13. The spectrometric measurement apparatus of claim 10, wherein the diffraction grating disperses the light from the first mirror so that the light in the first wavelength region is incident on the second mirror and the light in the second wavelength region is directed past the second mirror to be incident on the third mirror.

14. The spectrometric measurement apparatus of claim 9, wherein the spectrometric measurement apparatus comprises a Spectroscopic Ellipsometer or a Spectroscopic Reflectometer.

15. A spectrometric measurement method comprising:
emitting broadband light from a light source;
directing the broadband light to be incident on a measurement target by using an illumination optical system;
emitting light reflected from the measurement target through an imaging optical system; and
dispersing light from the imaging optical system according to wavelength of the light from the imaging optical system by using a dual resolution spectrometer and directing the dispersed light into two wavelength regions to detect the dispersed light in the two wavelength regions with different resolutions from each other,
wherein light in a first wavelength region is solely directed to a second mirror and light in a second wavelength region is solely directed to a third mirror, the second wavelength region does not overlap the first wavelength region.

16. The spectrometric measurement method of claim 15, wherein the dispersing of the light comprises:
emitting light from the imaging optical system via a slit of a slit plate and directing light from the slit to a first mirror;
reflecting the light from the slit to a diffraction grating by the first mirror;
dispersing the light from the first mirror according to a wavelength by the diffraction grating, wherein the diffraction grating solely directs light in the first wavelength region among the light dispersed by the diffraction grating to the second mirror and solely directs light in the second wavelength region among the light dispersed by the diffraction grating to a third mirror;
reflecting light in the first wavelength region among the light dispersed by the diffraction grating to a detector by the second mirror and reflecting the light in the second wavelength region dispersed by the diffraction grating to the detector by the third mirror; and
detecting the light in the first wavelength region and the light in the second wavelength region with different resolutions from each other by the detector.

17. The spectrometric measurement method of claim 16, wherein:
the first wavelength region comprises a relatively long wavelength region; and
the second wavelength region comprises a relatively short wavelength region.

18. The spectrometric measurement method of claim 16, wherein:
the second mirror and the third mirror each are a focusing mirror focusing light on an image detection surface of the detector; and
resolution of the light in the second wavelength region is increased by positioning the third mirror farther from the diffraction grating than the second mirror.

19. The spectrometric measurement method of claim 16, wherein a number of gratings of the diffraction grating per unit length is adjusted so that the light in the first wavelength region is incident on the second mirror and the light in the second wavelength region is directed past the second mirror to be incident on the third mirror.

* * * * *